United States Patent [19]

Erickson

[11] 4,207,298
[45] Jun. 10, 1980

[54] HIGH TEMPERATURE REMOVAL OF $H_2S$ FROM REDUCING GAS

[76] Inventor: Donald C. Erickson, 1704 S. Harbor La., Annapolis, Md. 21401

[21] Appl. No.: 867,323

[22] Filed: Jan. 5, 1978

Related U.S. Application Data

[63] Continuation-in-part of Ser. No. 616,369, Sep. 24, 1975.

[51] Int. Cl.² .............................................. B01D 53/34
[52] U.S. Cl. .................................. 423/210.5; 423/232; 423/234; 423/563; 423/574 R
[58] Field of Search ...................... 423/210.5, 232, 234, 423/561, 574, 562, 563, 573

[56] References Cited

U.S. PATENT DOCUMENTS

| | | | |
|---|---|---|---|
| 3,919,390 | 11/1975 | Moore | 423/232 X |
| 3,954,938 | 5/1976 | Meissner | 423/210.5 |
| 3,966,875 | 6/1976 | Braetzler | 423/220 |
| 3,996,335 | 12/1976 | Wolk et al. | 423/210.5 |

FOREIGN PATENT DOCUMENTS 909108 10/1962 United Kingdom .................... 423/573

Primary Examiner—Earl C. Thomas

[57] ABSTRACT

High temperature reducing gas is scrubbed of $H_2S$ and other gaseous sulfur compounds at high temperature (>800° K.) in a highly efficient regenerative process. The scrubbing is effected in at least two sequential stages. The first stage scrubbing medium is a molten salt comprised essentially of molten alkali carbonates, sulfides, and hydroxides. The second stage is optionally either a metallic melt comprised of copper or a second molten salt. The copper melt is regenerated with air. The salt melts are regenerated with steam and/or $CO_2$. When two or more salt stages are used, they are regenerated stagewise countercurrently to the scrubbing sequence.

11 Claims, 2 Drawing Figures

HIGH TEMPERATURE REMOVAL OF H₂S FROM REDUCING GAS

BACKGROUND OF THE INVENTION

This application is a continuation-in-part of Ser. No. 616,369, filed Sept. 24, 1975.

The field of art of this invention is the one encompassing processes in which hydrogen sulfide is removed from a hot (e.g. 800 K.–1400 K.) gaseous mixture by chemical reaction with a condensed phase treating material. Further, the condensed phase treating material is revivified for reuse, i.e. the process is regenerative, and in one embodiment the treating material is a metal carbonate in solution.

Typical prior art related to this field of invention is described in U.S. Pat. Nos. 3,671,185 and 3,770,399, and in Office of Coal Research R&D Report No. 100.

The essence of all regenerative molten carbonate processes for scrubbing H₂S from hot reducing or fuel gases is to remove the H₂S from a gas having a low equilibrium pH₂S and transfer it to a gas having a substantially higher equilibrium pH₂S; i.e. to concentrate the H₂S. Traditionally a wide temperature swing of the molten salt has been required in order to achieve a sufficient degree of concentration, which introduces high thermal losses and requires the use of expensive ternary salt mixtures. A new method of achieving the desired concentrating effect on H₂S in the absence of temperature swings has now been discovered.

Some of the problems existing in the prior art practice of this field of invention are as follows. When the composition of the molten carbonate solution is adjusted to furnish the desired high degree of sulfur removal from the gas being treated, the carbonate solution necessarily holds the chemically bound sulfur with so much affinity that regeneration is difficult. Those processes which cool the sulfur-containing solution to facilitate regeneration have at least two serious problems. In order to maintain the solution molten at the lower temperature, they must use ternary solutions of the various alkali carbonates, which, due to the cost of Li₂CO₃, are much more expensive than plain Na₂CO₃ or Na₂CO₃-K₂CO₃ solutions. Also a substantial energy expenditure is involved in heating the salt back to treatment temperature—anywhere from 3 to 10% of the total heating value of the gas being treated, depending on the magnitude of temperature swing. Also, cooling and possibly heating exchangers may be required to be in contact with the extremely corrosive hot melt.

Most prior art processes require excessive handling and transport of the corrosive hot salt. They also are susceptible to excessive entrainment of salt vapors in the treated gas, which generally makes the treated gas unsuitable for gas turbine application without further cleanup.

Another important consideration in regard to overall energy efficiency of sulfur scrubbing processes is that when H₂S is removed from the gas, some of the heating value of the gas is lost, which is not the case when the H₂S is first oxidized to SO₂, and then the SO₂ removed.

Some regenerative high temperature H₂S scrubbing processes, including those using CaCO₃, dolomite, or iron oxides, require an expensive fuel gas for regeneration of the scrubbing material. This invention only requires steam and/or CO₂ and air.

SUMMARY OF THE INVENTION

The gas is contacted with at least more than one salt melt, the first melt having a higher sulfide loading than the second. Stagewise regeneration is conducted countercurrent to the absorption contacting actions. Alternatively, treated gas can be contacted with molten copper after being contacted with the carbonate melt, and the copper sulfide regenerated to copper by air. Preferably the treatment may combine both the multistage carbonate treatment and the copper treatment. In some applications the copper treatment alone is desirable.

Included among the objects of this invention are to provide an efficient regenerative process for scrubbing H₂S from a hot reducing gas, to provide a process not requiring the use of expensive salts or large temperature swings, to provide a process with improved regeneration efficiency for a given level of scrub efficiency, and increased energy savings, and other objects, to provide a process which retains greater energy content in the scrubbed gas, to provide a process which uses only readily available low cost regenerants—steam and/or CO₂ and air, and to provide a process which can operate adiabatically in simple refractory lined vessels and which requires minimal handling or transport of the corrosive scrubbing media.

THERMODYNAMIC BACKGROUND OF THE INVENTION

Figure 1:
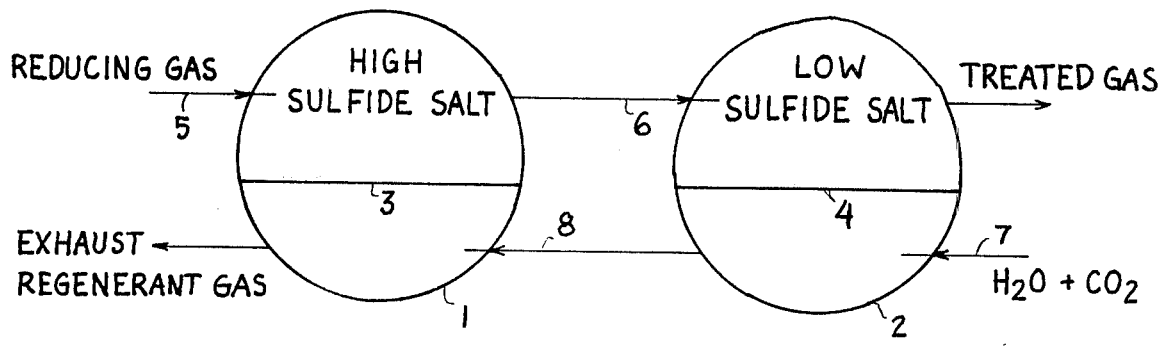
FIG. 1 is a schematic illustration of the multistage alkali salt treatment, wherein the absorption or scrubbing steps are conducted countercurrent to the regeneration steps.

When removing H₂S from a gas mixture by reaction with a molten or fused nonaqueous carbonate salt which is subsequently regenerated, the chemical reaction involved is typified by the following:

$$Na_2CO_3 + H_2S = Na_2S + H_2O + CO_2 \tag{1}$$

Potassium, lithium, and/or calcium carbonates can be substituted for or added to the sodium carbonate, and the following thermodynamic principles still apply.

When the gas being treated is a reducing or fuel gas, i.e. has a high CO and/or H₂ content, alkali sulfates do not form to any significant extent in the salt because of the high oxygen affinity of the CO and H₂ species. However, as will be discussed subsequently, small concentrations of hydroxide will form in the salt and will contribute substantially to the overall process. Other species in the salt are either nonreactive or their equilibrium concentrations are so low they can be neglected, e.g. oxides, nitrites, sulfites, etc.

In the absorption, scrubbing, or gas treating step, the above reaction proceeds left to right. During regeneration, the same reaction occurs in the opposite direction. Clearly, it is desired to have the reaction proceed far to the right during absorption, in order to reduce the H₂S concentration to the desired low levels. However that would not be desirable during regeneration, when a shift of the reaction equilibrium to the left is desirable in order to reduce the amount of steam and $CO_2$ required for regeneration. The extent of the reaction in either direction is given by the equilibrium constant:

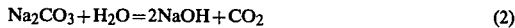

$$K_1 = e^{-\frac{\Delta G^\circ}{RT}} = \frac{a(Na_2S)\, pH_2O\, pCO_2}{a(Na_2CO_3)\, pH_2S}$$

where
- $a(X)$ = activity of condensed species X
- $pX$ = partial pressure of gaseous species X
- $T$ = temperature
- $\Delta G^\circ$ = the change in Gibbs free energy of the reaction when all products and reactants are in their standard states $K_1$ is a constant at a given temperature; at 1150 K. it has an approximate value of 10 for sodium cations, 500 for calcium or potassium cations, and 0.6 for lithium cations.

The parameter of interest is $pH_2S$, which at equilibrium is given by

$$pH_2S = \frac{1}{K_1}\, \frac{a(Na_2S)}{a(Na_2CO_3)}\, pH_2O\, pCO_2$$

When injecting a gas into a melt containing molten $Na_2CO_3$ and $Na_2S$, if the $pH_2S$ of the gas is initially larger in value than the equilibrium value given in the above equation, $Na_2S$ will form and $Na_2CO_3$ will be consumed until $pH_2S$ is reduced to the equilibrium value; if $pH_2S$ is initially smaller than the equilibrium value, the opposite will occur.

An important aspect of these teachings is the concept that the basic composition of the salt melt is controlled by the composition and respective amounts of reducing gas and regeneration gas being supplied to the melt, rather than by withdrawal of contaminated melt, reconstitution of same, and then reintroduction of pure carbonate salt. This has at least one important consequence. Since there is an appreciable steam content in the equilibrated gas mixture exiting both the scrub region and the regeneration region, there will unavoidably be created a small amount of hydroxide in the melt in accordance with the reaction stoichiometry $$Na_2CO_3 + H_2O = 2NaOH + CO_2 \qquad (2)$$

and similarly for K, Li, and/or Ca.

The presence of hydroxide in the melt is important because it is also an effective $H_2S$ scrubber, in accordance with the reaction stochiometry $$2NaOH + H_2S = Na_2S + 2H_2O \qquad (3)$$

and similarly for K, Li, and/or Ca.

In all of the alkali salt melts to be described in the examples, the carbonate concentration is typically 2 to 100 times greater than the hydroxide concentration, and the hydroxide concentration is in the range of ½ to 25 percent. Nevertheless it will be seen that the small amount of hydroxide present frequently accounts for more than half of the actual $H_2S$ scrubbing which occurs. This is primarily due to the fact that the regeneration gas normally contains more steam than $CO_2$ for economic reasons.

Another important discovery associated with the two preceding reaction stoichiometries is that it is not necessary to supply any $CO_2$ in the regeneration gas, i.e. pure steam will suffice. The $CO_2$ necessary to support reaction (1) is in effect supplied by reaction (2) in the regeneration region, and then the carbonate content of the melt is restored by the reverse of reaction (2) in the scrub region. It will be understood that any discussion of a particular reaction is actually a simplification; i.e. that what is involved is a multicomponent equilibrium and that all species in both the salt and gases are continually undergoing complex and diverse reaction paths enroute to the unique equilibrium compositions. The artisan practicing this invention exercises control over the scrub and regeneration equilibrium compositions by controlling the mixture of cations in the salt; the temperature, pressure, composition and flow rate of both the scrub gas and regeneration gas; and the circulation rate of salt between the respective scrub and regeneration reaction regions. Once the above control parameters are fixed, the remaining dependent parameters are automatically fixed in value. The dependent parameters include the anion composition of the salt in each reaction region and the $pH_2S$ in both the scrubbed reducing gas and the regeneration gas. The artisan should choose the cation mix such that the salt will be suitably molten at the temperature, scrubbing efficiency, and anion mixture of interest, and also such that the anion mixture will include a sulfide concentration within the approximate limits of 1% to 70%, in order to obtain acceptable mass transport characteristics (i.e. ability of the salt to transport sulfide ion from scrub region to regeneration region).

During the scrubbing reaction the $pCO_2$ and $pH_2O$ are essentially fixed by the composition of the reducing gas. Similarly during regeneration they are largely determined by the composition of the regenerant gas. The product $pCO_2\, pH_2O$ is typically on the order of 30 times larger in the exhaust regenerant gas than in the treated reducing gas, depending upon the precise steam to $CO_2$ ratios involved. Thus if both the absorption and regeneration steps are carried out using approximately the same melt composition, pressure, and temperature, then the equilibrium $H_2S$ concentration in the gas exiting the regenerator will be approximately 30 times greater than the equilibrium $H_2S$ concentration in the treated gas. Since emission standards require reducing the $H_2S$ content of the reducing gas to approximately 0.07 volume percent, the gas from the regenerator will contain at best only approximately 2 volume percent $H_2S$ (i.e. 30 times 0.07%) for the above conditions. Such a process would be uneconomic due to the high cost of generating sufficient regenerant steam and $CO_2$—fifty moles of steam plus $CO_2$ would be required per mole of $H_2S$ scrubbed. Also this low concentration of $H_2S$ would not be suitable for feed to a Claus plant.

Clearly it is desirable to have the equilibrium $pH_2S$ during regeneration more than 30 times greater than the equilibrium $pH_2S$ during absorption. Conceptually there are three ways of doing this: conducting the absorption reaction at higher temperature (higher value of $K_p$) than the regeneration reaction; conducting the absorption reaction at lower pressure than the regeneration reaction; or conducting the absorption reaction with a lower sulfur loading in the melt (lower $a(Na_2S)/a(Na_2CO_3)$ ratio) than the regeneration reaction. Also combinations of the above could be used. This application discloses the approach of using variable sulfide loadings, whereas a copending application discloses the approach of conducting regeneration at higher pressure than the absorption reaction.

Exploitation of a variable sulfur loading in the melt involves the use of solution thermodynamics, as described in recent texts on extractive metallurgy or physical chemistry. The melts are ionic in nature; the various alkali and alkaline earth carbonate salts and sulfide salts are completely miscible. The activities of the various species are given approximately by the product of their ionic fractions. This implies, for example, that a salt solution comprised of 70 mole percent $Na_2CO_3$ and 30 mole percent $Na_2S$ would have the ratio $a(Na_2S)/a(Na_2CO_3)$ equal to $0.3/0.7 = 0.43$. Such a solution has a higher equilibrium $pH_2S$ than a solution comprised of 90 mole percent $Na_2CO_3$ and 10 mole percent $Na_2S$ at the same temperature. Hence the $H_2S$ content of the exhaust regeneration gas can be increased relative to the $H_2S$ concentration of the treated gas if the sulfide proportion, or sulfide loading, of the molten salt solution in the regeneration region is greater than that in the absorption region. Unfortunately the natural propensity is just the opposite; since sulfide is being added to the melt in the absorption region, and removed from the melt in the regeneration region, the sulfide loading tends to be higher in the absorption region and lower in the regeneration region. However, by adopting the teachings of this specification, i.e. a multistaged countercurrent arrangement, the desired effect can be achieved. In particular, more than one set of reaction regions is established, each set consisting of both an absorbing region and a regeneration region. The salt melt of each set has a different sulfide loading, and the melts are arranged in sequential order of sulfide loading. The gas to be treated is contacted first with the highest sulfide melt, and sequentially with the subsequent melts in descending order of sulfide loading. The regeneration gas is routed through the melts countercurrent to the gas being treated, i.e. it is initially contacted with the lowest sulfide melt, and subsequently routed sequentially through the melts in ascending order of sulfide loading.

To elaborate upon the preceding simplified explanation, the actual characteristic which is essential in order to distinguish the sequential reaction stages is that the equilibrium $pH_2S$ be different in each stage, for example at least a 10% difference. When the various stages are comprised of the same cation mixture and held at the same temperature and have the same product $pH_2O \cdot pCO_2$, a difference in the equilibrium $pH_2S$ necessarily equates to a difference in sulfide loading, as revealed by reaction (1) or (3). However in unusual circumstances it is possible that due to varying the cation mixture and/or the temperature of the different stages, one stage which has a higher equilibrium $pH_2S$ than another may actually have a lower sulfide loading than the one with lower equilibrium $pH_2S$. Therefore the claims cite this more general distinguishing characteristic between the plurality of salt stages. A difference in equilibrium $pH_2S$ or sulfide loading between two salt stages is also equivalently referred to as a difference in sulfur affinity of the two stages. In a second embodiment, this invention involves reacting the gaseous mixture being treated with pure or dissolved molten copper, either subsequent to or in lieu of the reaction with molten salt. The $Cu_2S$ which is formed is regenerated by reacting it with an oxygen containing gas, preferably air. The reaction during absorption is $$2Cu + H_2S = Cu_2S + H_2 \tag{4}$$

and for regeneration is $$Cu_2S + O_2 \text{ (from air)} = 2Cu + SO_2 \tag{5}$$

Copper has a strong affinity for sulfur, such that the absorption reaction achieves a high degree of sulfur removal. Copper also has a lesser affinity for $O_2$ than does $SO_2$ (i.e. free energy of formation of $2Cu_2O$ is less negative than free energy of formation of $SO_2$) which allows the regeneration reaction to occur essentially quantitatively. No other common low melting point metal shares these attributes of copper. There is little advantage to multistaging the copper treatment, because the regeneration reaction is essentially quantitative in a single stage.

A typical reducing gas generated from high sulfur coal or heavy oil has a $pH_2/pH_2S$ ratio of approximately 35, and the equilibrium $pH_2/pH_2S$ of a reducing gas exiting the copper bath at 1375 K. is 350. That is, the copper bath will reduce the sulfur content to approximately 10% of its initial value.

There are two major advantages derived from using the copper treatment subsequent to the molten salt treatment. First, the thermal energy normally expended in the Claus process is retained instead in the fuel gas. In the Claus process for disposing of $H_2S$, one third of the $H_2S$ is burned with air, and the resulting $SO_2$ is reacted with the remaining $H_2S$ to yield elemental sulfur and $H_2O$. By in essence burning the $H_2S$ to $SO_2$ in the copper bath rather than in the Claus converter, most of that energy becomes sensible heat of the fuel gas. Secondly, the treated gas exiting the salt bath can have a substantially higher $H_2S$ content, since the copper treatment removes one third of the sulfur and reduces its concentration to the desired low level. Therefore the salt melt equilibrium point, e.g. sulfide loading, will be such that a more effective regeneration can be achieved.

DESCRIPTION OF THE PREFERRED EMBODIMENTS

In one preferred embodiment two or more molten salt baths are established, each one in a separate container configured with a divided or baffled gas space such that separate contact can be effected between the salt and reducing gas in one region and between the salt and regenerant gas in another region without the gas phase reactants or products mixing. The reducing gas being treated is contacted with one salt bath and subsequently with the other. The regenerate gas is contacted with the two salt baths in opposite order, i.e. countercurrent to the reducing gas. During normal operation, the salt first contacted by the reducing gas has a higher sulfide loading, or more rigorously a higher equilibrium $pH_2S$, than the second salt bath. The salts can initially be pure carbonates, as the equilibrium sulfide and hydroxide concentrations will automatically be acquired during operation. The salt is comprised preferably of sodium or sodium plus potassium cations. An alkaline earth carbonate, preferably $CaCO_3$, may be dissolved in the salt to increase its sulfur affinity, i.e. decrease the equilibrium $pH_2S$ for a given level of sulfide loading, or equivalently to increase the sulfide loading for a given equilibrium $pH_2S$.

Increased sulfide loading lowers the melting temperature of the salt up to approximately 30% sulfide. Thus substantially pure sodium salt can be used at temperatures as low as 1075 K. provided the salt is maintained between 20% and 40% sulfide. For NaK salt mixtures, temperatures as low as 925 K. can be used. Addition of up to 10% $CaCO_3$ to the melt may either raise or lower the melting point, depending on whether or not it raises the sulfide loading beyond the approximate 30% level where the minimum melting point is obtained.

The sulfide loading of the two salt baths can be varied by varying the flow ratio of reducing gas to regenerant gas: e.g. increased flow of regenerant gas relative to flow rate of reducing gas causes sulfide loading of both salt baths to decrease, and $H_2S$ concentration in both the treated gas and the exhaust regenerant gas to decrease.

"Reducing gas" encompasses producer gas, fuel gas, synthesis gas, partially oxidized fuel gas, and other gaseous compositions commonly given this name. The reducing gas initially may have a substantial hydrocarbon or carbon content, as it is known that the carbonate and sulfide salts catalyze the reaction between them and steam. The gaseous sulfur compounds which exist at equilibrium in a reducing gas are predominantly $H_2S$. A typical distribution is 92% $H_2S$, 6% COS, and balance all others. If the reducing gas has a fairly low $H_2$ and CO content relative to $H_2O$ and $CO_2$, e.g. 10% quality, then appreciable amounts of $SO_2$ will also be present, e.g. a few percent. The salt and copper processes disclosed are also effective in scrubbing COS, with the CO portion of the COS molecule replacing the $H_2$ portion of the $H_2S$ molecule in reactions (1), (3), and (4). It should be noted that one important reason for maintaining the approximate equilibrium concentration of ½ to 25 percent hydroxide in the melt is that without it, most of the $H_2S$ in both the absorption and regeneration gases will be converted to COS. The reaction stoichiometry is analogous to reaction (2) in which $H_2O$ is converted to $CO_2$ by the salt. High temperature refers approximately to 800 K. or higher. The salt regenerant gas is comprised of steam optionally admixed with $CO_2$. It may be derived in part from various gases containing $CO_2$ such as exhaust combustion gases, i.e. it may contain nitrogen for example. The various incoming and exiting gas streams from the scrubber and regenerator may be configured in heat exchange relationship with one another as is known to the art.

FIG. 1 illustrates a two-stage molten salt embodiment. Container 1 contains the first salt, and container 2 contains the second salt with lower sulfide loading. Baffles 3 and 4 divide the gas spaces of the respective containers such that separate contact with the two different gaseous reactants is possible. Reducing gas is contacted with the first melt through lance 5, and subsequently the partially scrubbed reducing gas is contacted with the second melt through lance 6. Regenerant gas is contacted with the low sulfide melt first, through lance 7, and subsequently the partially depleted regenerant gas is contacted with the high sulfide melt through lance 8.

Although the method of contacting shown is simple bubbling through a lance, any method of contacting known to the art is possible. For example, spraying, blowing the gas through a Venturi and injecting salt at the throat or jetting the gas tangentially into the melt whereby rotary motion is imparted to the melt. One marked advantage of the bubbling or jetting techniques is that no forced circulation or other handling of the corrosive salt is required. Since the process can be adiabatic and requires no forced circulation, very simple and inexpensive refractory lined reactor vessels can be used.

If the reducing gas has flyash or other insoluble content, occasional purification or discard of the first salt bath will be required, through a side slipstream or other means known to the art.

The salt equilibrium is pressure and temperature sensitive; thus increasing the pressure or decreasing the temperature for the same gas composition causes the sulfide loading of the salt to decrease. In order to maintain the sulfide loading greater than 1% at high pressures or low temperatures, it is necessary to have a high potassium cation content in the salt, as is shown in the examples. The temperature of both the absorption and regeneration regions of each salt melt can be approximately the same. Various other multistaged countercurrent configurations are possible, as described in copending patent application 560,342. The gas flows can be split or joined between salt baths. Also, a single salt melt can be circulated successively through two or more scrub stages in stagewise countercurrent sequence to the reducing gas sequence, and then through two or more regeneration stages in stagewise countercurrent sequence to the regeneration gas sequence. The required varying degrees of sulfide loading in the successive stages are obtained by virtue of the chemical reaction occurring in each stage. The circulation rate of the salt determines the difference in sulfide levels between the successive stages for given gas flow rates.

In a second preferred embodiment of this invention, the reducing gas is contacted with a solution containing molten copper after it is contacted with the molten salt, and the $Cu_2S$ thereby formed is regenerated by air or other oxygen containing gas. Both the copper and $Cu_2S$ are molten at 1375 K. As the reducing gas exiting the salt bath is generally in the temperature range of 800 K. to 1200 K., it may by necessary to heat the reducing gas before contact with the molten copper. This is preferably done by bleeding additional combustion air into the reducing gas. Alternatively, the copper bath temperature can be reduced by dissolving the copper in other liquid metals. Suitable metals should have, in addition to a low melting point, a lower oxygen affinity than sulfur and a lower sulfur affinity than copper. Lead, bismuth, antimony, and silver meet these criteria.

The concentrated $SO_2$ regenerated from the copper bath can be combined in roughly 1 to 2 proportions with $H_2S$ from the salt regeneration to yield sulfur. It may be desirable to first additionally concentrate the $H_2S$, such as by condensing out excess $H_2O$, or using other means known to the art such as solution in hot aqueous carbonate. The precise $H_2S$ and $SO_2$ proportions are not important provided the tail gas is recycled to the molten salt bath, being preferably combined with the reducing gas.

Figure 2:
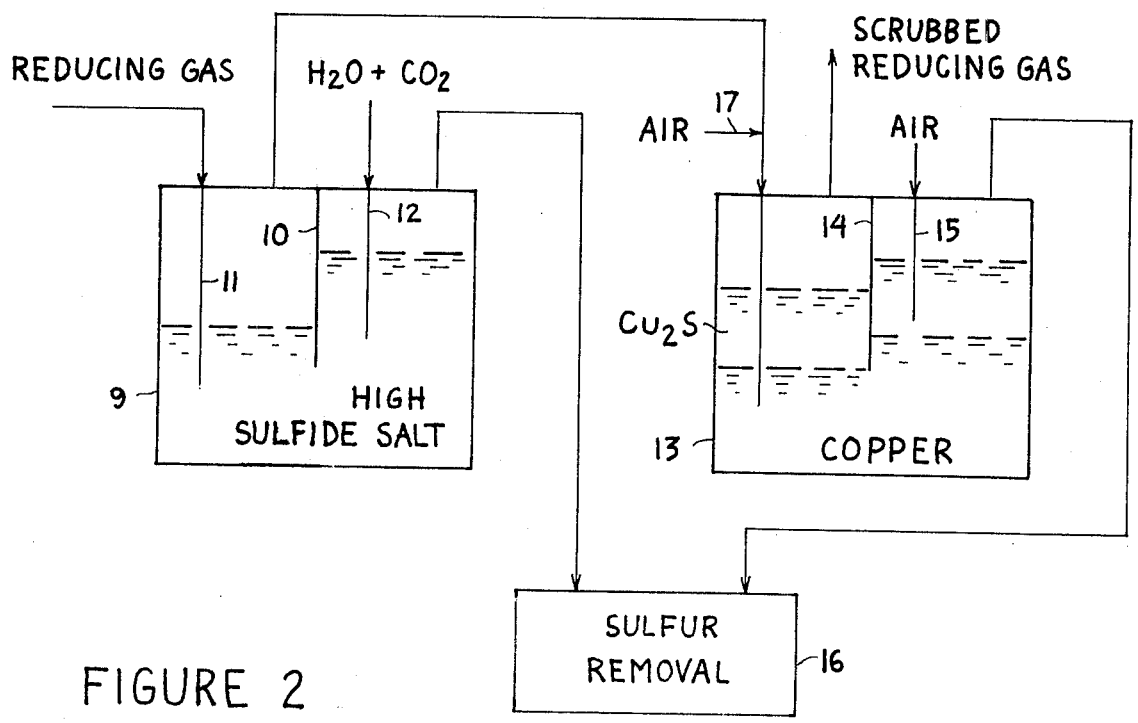
FIG. 2 is a schematic illustration of a process in which H₂S is partly removed by contact with molten salt, which is regenerated by steam and CO₂, and additional removal of H₂S is achieved by contact with molten copper, which is regenerated by air. The regenerative gases, in approximate 2 to 1 ratio of sulfur species, can be reacted as shown to yield elemental sulfur.

The molten salt bath employed in combination with the copper bath may be the multistaged embodiment described above, or it could be a simpler single stage configuration. FIG. 2 illustrates the latter configuration. In FIG. 2, container 9 holds a single salt bath and baffle 10 allows the salt to be contacted separately by reducing gas, injected through lance 11, and by regenerant gas, injected through lance 12. Container 13 holds the molten copper solution and $Cu_2S$, and it is also divided by a baffle 14 which allows the copper to be contacted separately by the partially scrubbed reducing gas exiting container 9, and the $Cu_2S$ to be contacted separately by air or other oxygen containing gas, injected through lance 15. As is known in the copper converter art, the $Cu_2S$ floats on the copper and the air should be injected into the $Cu_2S$. The regenerant gas exiting the container 13 is comprised principally of $SO_2$ and nitrogen. It is preferably combined with the $H_2S$-containing regenerant gas exiting from container 9 to make sulfur, in the means for sulfur recovery 16. The tail gas is preferably recycled to the salt bath. The partially scrubbed reducing gas entering container 13 preferably is heated by introducing additional combustion air 17.

In addition to previously cited advantages, the copper bath tends to reduce the salt content of the treated reducing gas, which is important for gas turbine applications. The copper bath is also useful by itself for removing $H_2S$ from any high temperature gas. However the relatively high cost of copper dictates that the gas being treated be very low in inorganic or ash content. Fortunately the salt bath very effectively removes flyash from the reducing gas. When the molten copper is used alone for $H_2S$ removal, the regeneration product is $SO_2$, which is more difficult than $H_2S$ to reduce to sulfur.

EXAMPLES

In order to illustrate both the advantages of this invention over the prior art and the wide range of conditions under which this invention can be practiced, the following examples are presented. All of the values cited are subject to experimental error, and therefore should be taken as only generally indicative of preferred ranges of operation, but not construed to limit the invention as defined by the claims. In each example, a fuel gas of the composition indicated below is bubbled into (i.e. contacted with) one or more stages of molten salt and/or molten copper.

Fuel gas composition:
CO—28%
$H_2$—22%
$CO_2$—5%
$H_2O$—7%
$N_2$—37.28%
$H_2S$—0.72%

The quality of this gas, i.e. the ratio of $CO+H_2$ to $CO+H_2+H_2O+CO_2$, is 80%, and the $C/H_2$ ratio is 1. This fuel gas composition is typical of that which would be obtained from partial oxidation of a high sulfur (4.1 w/o) bituminous coal with air, or alternatively a high sulfur residual oil. In every example, the flow rate of regeneration gas is adjusted so as to cause the $H_2S$ concentration of the reducing gas to be reduced to 0.09%, i.e. such that 87.5% of the sulfur present in the sour gas has been removed. The resulting fuel gas is well within $SO_x$ emission specifications after combustion. The results of each example are summarized in the table.

| Example | Temperature (K) | Pressure (atm) | Salt Cation (%) | Regeneration Steam Fraction | High S Stage anion percent S scrub/regen | High S Stage anion percent OH scrub/regen | $f_{OH}$ (5) | Low S Stage anion percent S scrub/regen | Low S Stage anion percent OH scrub/regen | $f_{OH}$ (5) | Regeneration Gas Requirement (1) | $H_2S$ Concentration (2) | Dry $H_2S$ Concentration (3) | Flow Ratio (4) |
|---|---|---|---|---|---|---|---|---|---|---|---|---|---|---|
| 1 | 1150 | 10 | 100 Na | .8 | (single stage) | | | 18.2/11.7 | 3.4/6.1 | 21.8 | 43.9 | 2.3 | 11.1 | 3.6 |
| 2 | 1150 | 10 | 100 Na | .8 | 43.6/39.1 | 2.8/5.2 | 30.5 | 18.2/15.7 | 3.4/5.8 | 54.3 | 11.4 | 9.4 | 36.8 | 13.9 |
| 3 | 950 | 10 | 50 Na 50 K | .8 | 48.8/44.8 | 0.5/1.1 | 7.3 | 20.9/18.6 | 0.7/1.2 | 11.5 | 12.4 | 8.6 | 38.2 | 12.8 |
| 4 | 1150-1375 | 10 | 100 Na | .8 | 40.7/35.8 | 2.9/5.5 | 29.9 | (molten copper) | | | 8.8 | 8.2 | 33.9 | 17.2 |
| 5 | 875 | 1 | 50 K 30 Na 20 Li | .8 | 52.5/48.5 | 0.4/0.8 | 5.0 | 23.2/20.8 | 0.5/0.8 | 7.7 | 12.4 | 8.6 | 38.2 | 12.8 |
| 6 | 850 | 1 | 45 K 30 Na 25 Li | .8 | 30.2/26.2 | 0.4/0.8 | 4.9 | 10.7/8.6 | 0.4/0.8 | 7.4 | 13.1 | 8.2 | 37.0 | 12.1 |
| 7 | 850 | 1 | 40 K 30 Na 30 Li | .8 | 19.4/15.2 | 0.5/0.9 | 5.6 | 6.6/4.5 | 0.5/0.9 | 8.9 | 14.2 | 7.4 | 33.8 | 11.2 |
| 8 | 1250 | 30 | 100 Na | .8 | 34.1/29.5 | 5.1/8.7 | 46.0 | 13.1/10.7 | 5.9/9.7 | 88.1 | 10.9 | 9.9 | 35.3 | 14.5 |
| 9 | 1250 | 30 | 100 Na | .9 | 33.3/28.1 | 5.2/11.4 | 79.2 | 13.1/10.6 | 5.9/13.0 | 100 | 15.0 | 7.0 | 37.5 | 10.6 |
| 10 | 1250 | 30 | 100 Na | 1.0 | 31.0/24.8 | 5.3/17.8 | 100 | 13.1/10.3 | 5.9/22.3 | 100 | 31.9 | 3.2 | 38.6 | 5.0 |
| 11 | 1150 | 10 | 1000 Na | .7 | 43.9/39.6 | 2.8/4.0 | 15.3 | 18.2/15.8 | 3.4/4.5 | 24.5 | 9.1 | 12.0 | 33.4 | 17.4 |

Table footnotes
(1) moles of regeneration gas mixture required to scrub 1 mole of $H_2S$.
(2) volume percent concentration of $H_2S$ in the exhaust regeneration gas.
(3) volume percent concentration of $H_2S$ in the exhaust regeneration gas after the steam is condensed out.
(4) ratio of reducing gas molar flow rate to regeneration gas molar flow rate.
(5) percent of sulfur scrubbing done in that stage by hydroxide.

EXAMPLE 1.

The gas is bubbled through a single salt stage. Both scrub and regeneration are conducted at a pressure of 10 atm. and a temperature of 1150 K. The equilibrium $pH_2S$ of the scrub reaction must have the low value of 0.09 atmospheres in order to achieve the desired degree of scrubbing; this causes the equilibrium $pH_2S$ of the regeneration reaction to be correspondingly low (0.23 atmospheres in this example). Thus the requirement for regeneration gas is very high—43.9 moles of regenerant gas (80% steam and 20% $CO_2$) must be supplied for every mole of $H_2S$ which is scrubbed from the fuel gas. The table shows conditions existing in the molten salt for this example: the sulfide concentration is 18.2% in the scrubbing zone of the reactor, and is reduced to 11.7% in the regeneration zone of the reactor. The hydroxide mole fraction is 0.061 in the regeneration zone; the hydroxide salt accounts for 21.8% of the sulfur scrubbing which occurs, and thereby is reduced to 3.4% concentration in the scrubbing zone. The remaining anion, carbonate, is at a 0.784 mole fraction in the scrubbing zone and a 0.822 mole fraction in the regeneration zone, and accounts for the balance of the sulfur compound scrubbing.

The extremely high regeneration gas requirement of this example is the reason that the prior art concluded that it would not be feasible economically to conduct this process adiabatically, i.e. with the scrubbing and regeneration reactions at approximately the same temperature. It was discovered and disclosed in the prior art that by reducing the temperature of the regeneration reaction by several hundred degrees F., the regeneration efficiency could be increased 4 or 5 fold. However, that technique dictated that only a low melting point salt could be used, i.e. one with appreciable lithium cation content, and also that a heat exchanger, separate reactors, and a salt pump be incorporated, which involved high capital costs and thermal losses. The following examples illustrate that with the present teachings, adiabatic operation is possible in a wide variety of conditions thereby avoiding the prior art difficulties cited above.

EXAMPLE 2.

The same salt, temperature, and pressure as in Example 1 are used (Na, 1150 K., 10 atm.), but in a two stage configuration with the fuel gas and regeneration gas flowing countercurrently through the stages. As shown in the table, the regeneration gas requirement is reduced from 43.9 moles per mole of $H_2S$ scrubbed to 11.4 moles, i.e. almost a 400% reduction, while retaining adiabatic operation. In the stage with high sulfide loading, 30.5% of the sulfur scrubbing is done by hydroxide salt, whereas in the low sulfide loading stage, 54.3% of the sulfur scrubbing is done by hydroxide. The sulfide concentration in the scrub portion of the high sulfide stage is 43.6%, and that of the low sulfide stage is 18.2%; thus the sulfide loading and also the equilibrium $pH_2S$ of the low sulfide state is $(43.6-18.2)/43.6=0.583$ or 58.3% lower than that of the high sulfur stage. The regeneration gas is the same 80% steam, 20% $CO_2$ mixture as used in Example 1. The exhaust regeneration gas in Example 2 is composed of 9.4% $H_2S$, 16.2% $CO_2$, balance steam. The regeneration gas exiting the low sulfide stage and entering the high sulfide stage is 3.3% $H_2S$, 19.2% $CO_2$, and balance steam. When the excess steam is condensed out of the exhaust regeneration gas, the $H_2S$ concentration is 36.8%, i.e. more than adequate for direct feed to a Claus plant. In this example, 1 mole of regeneration gas must be bubbled through the two salt baths for every 13.9 moles of fuel gas being scrubbed, i.e. the size of the regeneration region of each reactor vessel can be substantially smaller than the scrub region.

EXAMPLE 3.

This example shows that it is possible to practice this invention at the relatively low temperature of 950 K. while still not requiring the use of the relatively expensive lithium salts. An equimolar mixture of sodium and potassium salt is used at 950 K.; such a salt has a high enough sulfide loading at process conditions that its melting point is well below 950 K. Since potassium has a lower hydroxide affinity than dose sodium, the equilibrium hydroxide concentration in the two stages is less than that for pure sodium, and correspondingly the fraction of sulfur scrubbed by hydroxide in each stage is lower. Nevertheless this two stage process is nearly as efficient as the pure sodium example, i.e. only 12.4 moles of regenerant gas is required per mole of $H_2S$ scrubbed. The low temperature used in this example can be important in some applications wherein it is necessary to reduce the vaporous alkali content of the scrubbed reducing gas to trace ppm quantities, e.g. in combined cycle plants.

EXAMPLE 4.

This example illustrates the embodiment in which the fuel gas is scrubbed first by a molten salt stage and then by a molten copper stage. The fuel gas is first bubbled into a salt stage similar to the high sulfide loading stage of Example 2. Only approximately 60% of the sulfur is removed in that stage, but the resulting high sulfide loading yields a very efficient regeneration—only 8.8 moles of regeneration gas are required per mole of $H_2S$ removed. Then the partially scrubbed reducing gas is heated to the copper bath temperature—1375 K. This is done by injecting 0.23 moles of air (preheated to 800 K.) into each mole of reducing gas. The resulting combustion releases sufficient heat to raise the temperature of the resulting reducing gas to 1375 K. The new reducing gas composition is 24.8% CO, 10.9% $H_2$, 4.4% $CO_2$, 10.5% $H_2O$, 49.1% $N_2$, and 0.28% sulfur compounds ($H_2S$+COS). The quality is reduced to 70.5%, since some chemical energy has been converted to thermal energy. This gas is bubbled into the molten copper, which reduces the sulfur compounds to 0.06% by reacting with them to form copper sulfide, thereby releasing CO and $H_2$ into the fuel gas. The molten $Cu_2S$ is regenerated in a separate reaction region by blowing air into it. The $O_2$ in the air is quantitatively converted to $SO_2$. The $H_2S$ regenerated from the salt stage and the $SO_2$ regenerated from the molten copper stage are in approximate two to one ratio, and hence are suitable for direct feed to a Claus catalytic reactor, to form elemental sufur. The copper stage requires 4.8 moles of regeneration air per mole of $H_2S$+COS scrubbed.

EXAMPLES 5, 6, 7.

These examples all involve operation at a temperature so low that lithium cations must be included in the salt mixture to maintain it molten. The three examples illustrate the effect of decling K and increasing Li content of the salt. It can be seen that regeneration efficiency slowly declines as K content is decreased, and that as the K content approaches the Li content, the regeneration efficiency declines quite rapidly. The main reason for this is the increasingly low sulfide loading which is present in the low sulfide stage. The lower the sulfide loading, the more that mass transport limitations cause a deterioration of equilibrium $pH_2S$ between scrub and regeneration. It has been discovered that a sulfide loading lower than about 1 or 2% will result in quite inefficient regeneration, even with two stage operation. The examples reveal that at temperatures less than 900 K., it is desirable that the potassium cation content of the salt be kept above approximately 36 mole percent, and also above the lithium cation content, in order to maintain an acceptable amount of sulfide loading.

EXAMPLES 8, 9, 10.

These examples illustrate two facts: that it is possible to operate at quite high pressures, and also that it is possible to operate with declining amounts of $H_2O$ in the regeneration gas, even to the point where pure steam is used for regeneration. In each case Na cations are used, the temperature is 1250 K. and pressure is 30 atm. for both reactions. When a regeneration gas with 20% steam is used, the regeneration is even more efficient than in Example 2. This is due to the higher hydroxide concentration in each stage, i.e. the greater amount of scrubbing being done by hydroxides relative to carbonates. When the regeneration gas is reduced to 10% $CO_2$, the regeneration efficiency declines a moderate amount until 15.0 moles of regeneration gas are required per mole of $H_2S$ scrubbed. When pure steam is used as the regeneration gas, the regeneration efficiency declines quite substantially, requiring 31.9 moles regeneration gas per mole of $H_2S$ scrubbed. It should be noted however that this is still more efficient than the single stage process (Example 1), and that the efficiency can be further increased by adding additional countercurrent stages. Thus, depending on the relative economics of supplying steam vs $CO_2$, it is possible to practice this invention with any proportion of $CO_2$ in the regeneration gas supply including zero. Note that in Examples 9 and 10 one or both of the stages accomplishes 100% of the scrubbing by hydroxide. In those instances, not only is no $CO_2$ being consumed out of the regeneration gas by scrubbing sulfur, but some $CO_2$ is actually being introduced into the regeneration gas by reaction (2). Thus as more stages are added, the $CO_2$ content becomes higher each stage, causing regeneration to become more efficient.

By substituting potassium for part or all of the sodium cations, operation at even higher pressures becomes possible.

EXAMPLE 11.

This example illustrates how much the results of Example 2 can be improved by using 30% $CO_2$ regeneration gas vice 20% $CO_2$ regeneration gas. A noticable improvement is achieved (9.1 mole requirement vice 11.4); however, as indicated above, this improvement must be balanced against the cost of supplying additional $CO_2$ or the cost of adding additional stages in order to determine the preferred regeneration gas $CO_2$ content in any instance.

In all of the preceding two stage salt examples, it should be apparent that by adding additional countercurrent stages, either the regeneration efficiency could be increased while holding the same level of scrub, or the level of scrub can be increased while retaining the same regeneration efficiency, or any combination of the two. The examples showed that when holding the same level of scrub, regeneration efficiency was increased by a factor of 4 by adding a second stage. A third stage would approximately further double the regeneration efficiency, with rapidly diminishing improvements from additional stages. The exampls also showed that approximately the same scrub levels and regeneration efficiencies are achievable over a wide range of temperatures and pressures, provided the cation mixture is appropriately chosen to yield acceptable sulfide loadings and melting points.

In each of the preceding examples involving salt stages, the salt was circulated between the scrubbing and regeneration zones at a rate of 1 mole of salt circulated for every 10 moles of reducing gas which was scrubbed. However, in one of the most advantageous embodiments of this invention, the salt circulation is caused by impingement of the reducing gas and regeneration gas into the salt. With such a circulation system, only relatively limited control of the salt circulation rate is possible. Therefore two more examples were conducted, using the conditions of Example 2, except that the salt flow rate was doubled in one and halved in the other. Whereas Example 2 required 11.4 moles of regenerant gas per mole of $H_2S$ scrubbed, by doubling the salt flow rate, the requirement was reduced to 9.9 moles; and by halving the salt flow rate, the requirement was increased to 13.6 moles. Thus it can be concluded that quite a wide range of salt flows can be used without serious degradation of regeneration efficiency.

In order to further illustrate the unexpectedly improved regeneration efficiency which is obtained at temperatures below 900 K. when potassium cations comprise greater than 35% of the salt and lithium cations comprise less than 35% of the salt, another example was run duplicating the conditions of Example 7 except that a salt with 35 mole percent potassium and 35 mole percent lithium cations was used. That salt required 17.3 moles of regeneration gas per mole of $H_2S$ scrubbed. The sulfide concentration in the salt solution having low sulfide loading or sulfur affinity was reduced to 2.0% in the regeneration zone; this is the main reason for the low regeneration efficiency.

The gaseous sulfur compounds in the high temperature reducing gas—primarily $H_2S$ and $SO_2$— are also referred to as chemically combined sulfur.

I claim:

1. A process for scrubbing $H_2S$ from a high temperature reducing gas which comprises:
   a. establishing at least two separate and non-communicating molten nonaqueous salt solutions comprised of alkali cations and comprised of carbonate, sulfide, and hydroxide anions, wherein the sulfur affinities of the different salt solutions differ by at least 10%, and wherein the hydroxide concentration of each salt solution is maintained within the limits of 0.4% to 25% and the sulfide concentration of each salt solution is maintained within the approximate limits of 1% to 70%;
   b. routing the reducing gas serially through contact with each salt solution in order of decreasing equilibrium $pH_2S$, whereby $H_2S$ is scrubbed from the reducing gas by each salt solution and a scrubbed reducing gas results;
   c. separately routing a regenerate gas comprised of steam or steam and $CO_2$ serially through contact with each salt solution in order of increasing equilibrium $pH_2S$, whereby an $H_2S$ containing regenerant gas is obtained.

2. The process of claim 1 in which the salt solutions pass directly from the reducing gas contacting step to the regenerant gas contacting step without being subjected to indirect heat exchange.

3. The process of claim 1 wherein the same cation mixture is used in each salt solution, whereby the differing sulfur affinities of each stage are achieved by differeing sulfide loadings of each stage.

4. The process of claim 1 wherein the first salt is contained in a single vessel having separate contacting regions, and the second salt is contained in a second single vessel having separate contacting regions, whereby no forced circulation of the salt is required for the gas contacting actions.

5. The process of claim 1, comprising the additional steps of:
   a. contacting the scrubbed reducing gas with molten copper, whereby $Cu_2S$ is formed;
   b. contacting the $Cu_2S$ with an oxygen containing gas such as air, whereby the copper is regenerated and an $SO_2$ containing regenerant gas is obtained;

c. combining the H₂S and the SO₂ obtained in the respective regenerant gases to yield elemental sulfur at least in part.

6. The process of claim 5, wherein the molten copper is dissolved in a liquid metal solution consisting of metal selected from the group consisting of lead, bismuth, antimony, and silver.

7. The process of claim 1 in which the salt solutions are comprised of sodium salts or combined sodium and potassium salts, and in which the salt temperatures are in excess of 925 K. for all contacting actions.

8. The process of claim 1 in which the salt temperatures are less than 925 K. for all contacting actions, and in which potassium cations comprise at least 36% and lithium cations comprise no more than 35% of the cation mixture of each salt solution.

9. A regenerative process for removing H₂S from a high temperature reducing gas which comprises:
  a. contacting the reducing gas with at least one molten pool of salt solution consisting of sodium cations optionally admixed with cations selected from the group consisting of potassium and calcium and comprised of carbonate, hydroxide, and sulfide anions, whereby a partially scrubbed reducing gas is obtained;
  b. regenerating the molten salt solution with steam and CO₂, whereby an exhaust regenerant gas containing H₂S is formed;
  c. contacting the partially scrubbed reducing gas with a molten copper containing metal, whereby Cu₂S is formed;
  d. contacting the Cu₂S with air or other oxygen containing gas, whereby the copper is regenerated and an SO₂ containing gas is generated;
  e. combining the exhaust regenerant gas and the SO₂ containing gas so as to yield elemental sulfur.

10. The process of claim 9 wherein the salt hydroxide anions comprise between 0.4% and 25% of the anion composition, and wherein approximately twice as much H₂S is scrubbed from the reducing gas by the salt as by the copper, whereby the H₂S and SO₂ obtained in the regeneration gases are in approximate two to one ratio.

11. The process of claim 1 wherein the regenerant gas supply consists of steam.

* * * * *